INVENTORS
Robert M. Tuck, &
BY James J. Mooney
W. C. Middleton
ATTORNEY

United States Patent Office 3,021,676
Patented Feb. 20, 1962

3,021,676
TORQUE CONVERTER TRANSMISSION
Robert M. Tuck and James J. Mooney, Jr., Indianapolis, Ind., assignors to General Motors Corporation, Detroit, Mich., a corporation of Delaware
Filed Aug. 6, 1956, Ser. No. 602,150
19 Claims. (Cl. 60—54)

This invention relates to torque converters and more particularly, a variable capacity torque converter and control system therefor.

This torque converter, having a variable capacity converter pump and a speed responsive hydraulic control system for varying the capacity of the converter pump, provides more efficient torque multiplication between the input and output shafts where one operates at a variable speed and the other is required to operate at a constant speed. This converter and control system are particularly adapted to provide a constant speed drive which may be varied by manual or automatic adjustment over a wide output speed range where the input drive is capable of only one speed due to the fact; for example, that the prime mover, such as an alternating current electric motor, is capable of operating only at one speed or where the prime mover has two loads which vary independently and thus is operated at the constant speed. Under these conditions the output shaft governor is set at the desired speed and will control the variable capacity converter pump to provide with a constant speed input, an adjustable constant speed output under the control of the governor. This converter control system may also provide a constant speed output adjustable to selected speeds under control of the governor in applications having a variable speed input, such as farm machinery where the prime mover speed is varied to change the vehicle speed and a constant speed farm implement drive is required.

The capacity of the converter is varied by varying the angle of the movable pump vanes located in the axial flow portion of the vortex flow path of the torque converter at the outlet sides of the fixed pump blades. The movable blades are actuated by a crank mechanism controlled by a fluid motor actuated under the control of a slave positioning system controlled by the output shaft speed-responsive governor. The angular position of the movable blades with respect to the fixed blades may be varied from a forward blade angle through the position in axial alignment to a back blade angle to reduce the capacity of the converter pump to pump fluid and then may be further moved in the back angle direction to restrict the flow of fluid in the converter and finally to a closed position to substantially close the converter passages to stop flow to provide a neutral condition disconnecting the drive. The control system for the movable blades employs a fluid motor supplied with fluid from a suitable source at a regulated pressure. The exhaust from the fluid motor is controlled by an orifice valve actuated by the output shaft driven governor to position the piston of the fluid motor in accordance with the position of the valve element controlled by the governor to regulate the converter capacity in accordance with load changes to maintain a constant output speed. The exhaust from the fluid motor supplies the torque converter with operating fluid and the torque converter fluid and a spring act to return the fluid motor piston.

An object of the invention is to provide in a variable capacity torque converter, a pump having a fixed blade element and a movable blade element located at the output end of the fixed blade element and in the axial portion of the vortex flow path of the converter.

Another object of the invention is to provide in a variable capacity torque converter, a movable blade element mounted on a radial axis and connected to an annular co-axially located fluid motor by an axially movable cam ring operating a plurality of crankshafts on which the blades are mounted.

Another object of the invention is to provide in a variable capacity torque converter having movable blades, a fluid motor having a chamber normally supplied with fluid at a regulated pressure and a control to regulate the exhaust from the fluid motor chamber to position the fluid motor piston at an infinite number of positions to position the movable blades.

Another object of the invention is to provide in a variable capacity torque converter having movable blades, a control system employing a fluid motor having a chamber to move the blades and a source of fluid pressure connected to said chamber, a valve mechanism to control the exhaust from the chamber in response to an output shaft governor to position the piston to vary the position of the movable blades.

Another object of the invention is to provide in a variable capacity torque converter having movable blades, a hydraulic control system having a fluid motor, a source of fluid connected to said motor, a control system to exhaust fluid from the motor to vary the position of the motor and blades, a conduit to connect the exhaust to the torque converter to supply operating fluid to the torque converter and a pressure control device to maintain a lower pressure in the torque converter.

Another object of the invention is to provide in a transmission driven by a prime mover having an air circulating fan, an air duct to conduct air from the fan to the external finned surface of the torque converter.

These and other objects of the invention will be more apparent from the following complete description and drawings of a preferred embodiment of the invention.

FIGURE 1a is an enlarged view of the movable blade mounting.

Figure 3:
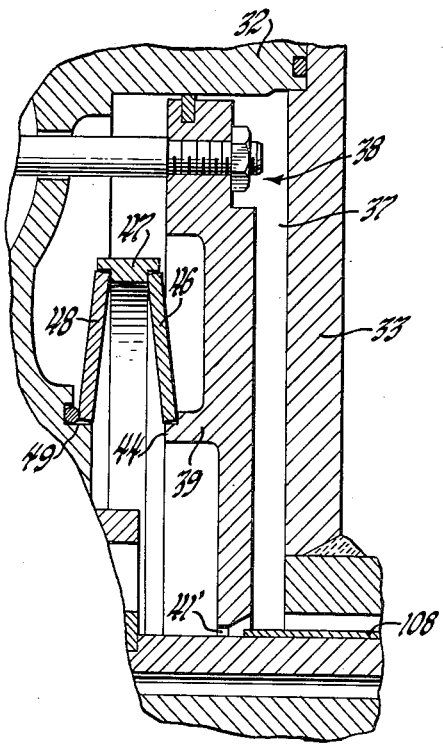
FIGURE 3 shows a modified fluid motor.

The variable capacity torque converter is mounted in a housing 10 and driven by a suitable prime mover output shaft or converter input shaft mounted in a bearing in a forward wall of housing 10, not shown, and connected to the converter input hub 11. The input hub 11 has a portion 12 which is connected by axial splines 14 with the splines 15 on the rotating pump housing 16 to provide a driving connection from the input shaft to the pump housing permitting relative axial movement. The front wall 18 of the pump housing 16 is a solid disk and has adjacent its center an annular shoulder 21 supporting the bearing 22 which rotatably supports the front end of the output shaft 24 but permits relative axial movement. The rear end of shaft 24 is rotatably mounted in a thrust bearing to axially position the shaft 24. The outer diameter of the front wall 18 of the pump housing 16 is suitably secured to the rear portion 25 which has a supporting hub portion 26 extending inwardly to the thrust bearing 27 which rotatably supports and axially fixes the entire pump housing 16 on the ground sleeve 28 which is secured to the housing 10. Cooling fins 31 are secured or formed integrally on the outer diameter of the rear portion 25 of the pump housing 16. The rear portion 25 also has an annular rearwardly extending annulus 32 connected by a driving hub 33 and the sleeve shaft 34 to drive the pump 35 which supplies fluid to the control system. The annulus 32 and hub 33 provide a chamber 37 for a fluid motor 38 having an annular piston 39 with a valve 40 to relieve excessive pressure and a central aperture or port 41. A sealed bearing 42 fixed on the piston at the edge of port 41 has a rotatable race contacting sleeve 108 to regulate the flow of fluid through port 41 to control the position of the piston and movable blades 56 as explained below. FIGURE 3 shows a modified port 41' which is closed when the sleeve 108 enters the small diameter portion of port 41'. Since there is no contact a bearing is not needed. The piston 39 has an annular recess or seat 44 supporting a first Belleville spring 46 which is connected by the annular seat ring 47 to the second Belleville spring 48 which is seated against an annular wire ring or bearing member 49 located in a recess in the supporting hub 26 of the pump housing 16. It is preferred that this combined spring have a constant rate to provide a uniform spring force acting on the piston 39 throughout its range of movement. Coil springs having a substantially flat or low rate may also be used.

Figure 4:
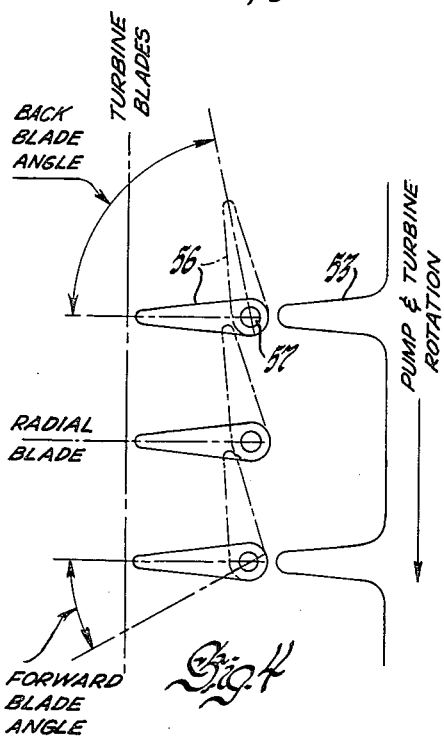
FIGURE 4 is a partial view showing the movable blades.
Figure 5:
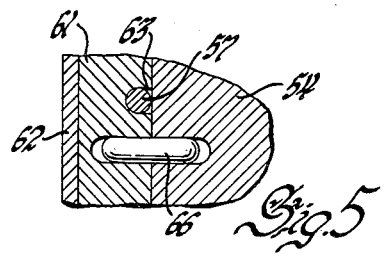
FIGURE 5 is a section of FIGURE 1 on the line 5—5 showing the blade crankshaft mounting detail.

The rear portion or outer shell 25 of the pump housing also supports the fixed pump blades 53 and the inner pump shell 54. The movable pump blades 56 are individually fixed to crankshafts 57 which pass through apertures 58 in the inner shell 54. There are twice as many movable blades 56 as fixed blades 53 (FIGURE 4) so that in addition to the movable blade located in alignment with each fixed blade 53 there is also an intermediate movable blade 56 located between each pair of fixed blades 53. The shafts 57 are located in slots 58 in the shell 54 and rotatably supported at their inner ends by a bearing ring 61 which is held in position by a snap ring 62 fitting into a groove in the inner surface of the inner shell 54. The bearing ring 61, as shown in FIGURE 5, has a bearing recess 63 for each shaft 57 and is angularly located by a pin 66 fitting into matching bores in the bearing ring 61 and shell 54. The outer ends of the shafts 57 are rotatably mounted in similar slots 68 formed in the outer bearing ring 69 which is located and secured between shoulders on the forward portion 18 and the rear portion 25 of the pump housing 16. The angular position of the bearing ring 69 is fixed by a pin (not shown) similar to pin 66. The blades 57 engage the inner and outer pump shell to axially locate each blade 56 and shaft 57 assembly. At the inner end of the crankshaft 57, crank 71 fits in an annular groove in the actuating ring 73 to connect the blades and actuating ring so that axial movement of the actuating ring moves each blade to the same angular position in the range of pitch or angle adjustment. The actuating ring 73 is mounted on and axially moved by a plurality of rods 76 which are connected at one end to the actuating ring 73 and the other end to the piston 39. The rods 76 may be located between the blades but are preferably located in a bore in a fixed pump blade.

The torque converter turbine 78 has a plurality of blades 79 and inner and outer shell portions and is connected by the hub 81 to the output shaft 24. Bearing 22 rotatably supports the hub 81 and the shaft 24 but permits relative axial movement between the shaft 24 and hub 81 and the forward wall 18 of hub housing. Since the pump housing 16 is rotatively fixed by bearing 27 to the ground sleeve, free forward expansion of the pump housing is permitted by the sliding spline drive 14—15 and the sliding bearing 22. A first stator 84 and a second stator 86, each having a plurality of blades and inner and outer shells, are rotatably supported for rotation in a forward direction by the free-wheeling brakes 87 and 88 which are mounted on the hub 89 secured to the ground sleeve 28.

The converter has the conventional torus arrangement of the pump blades 53 and 56, turbine blades 79 and stators 84—86 providing rotary flow of the fluid in the torus about the converter axis and vortex flow around the center of a cross section of the torus. The turbine blades 79 extend from a radial inlet edge adjacent the outer diameter of the torus in a partially reversing curve extending substantially radially inwardly to the outlet edge. The fixed pump blades 53 are similar but located on the opposite side of the torus and extend from an inlet edge adjacent the inner diameter of the torus in a partially reversing curve substantially radially outward to a radial outlet edge adjacent the outer torus diameter. The movable blades 56 have inlet and outlet edges located in parallel planes contiguous or closely adjacent and parallel to the parallel planes of the pump outlet edges and turbine inlet edges respectively.

Figure 2:
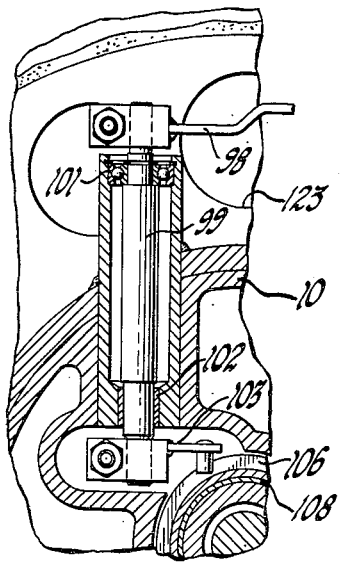
FIGURE 2 is a section of FIGURE 1 on the line 2—2.

The control system for the variable or movable vanes 56 is supplied with fluid by the pump 35 which has an input line 90 diagrammatically shown connected to the sump at the base of the transmission housing and an output line 91. The output line 91 is connected through a conventional pressure regulator valve 92 to exhaust 93 and by a passage 94 to chamber 37 of fluid motor 38. Regulator valve 92 relieves pressure in line 91 when cold oil blocks flow through the system or when the converter outlet restriction 112 is employed to maintain the converter pressure and this restriction creates an excessive pressure in the system. The fluid motor 38 is controlled by the output shaft driven governor 96 which may be of conventional construction and reciprocates the control rod 97 in accordance with speed variations in a well known manner. The rod 97 is connected to a crank 98 which, as shown in FIGURE 2, rotates a rod 99 suitably mounted in bearings 101 and 102 in the converter housing 10. The rod 99 at its lower end is connected by the crank 103 which fits in a groove 106 in the control sleeve 108. The governor 96 is adjustable to provide constant speed control at any speed setting within a wide range. The governor will maintain the speed of the output shaft 24 constant since the governor will actuate the hydraulic control system to vary the angle of blades 56 to provide the proper capacity torque converter to transmit the power required to drive the output shaft 24 at the governed speed. Thus, constant speed of the output shaft may be maintained, though the load varies within the capacity of the torque converter and the capacity or torque output of the prime mover. During constant speed operation the positive displacement pump 35 being driven by a constant speed prime mover provides a constant volume output which is delivered at a high pressure to fluid motor chamber 37 from which it exhausts through orifice port 41 at a lower pressure to the converter chamber and then exhausts through orifice 112 to the sump at atmospheric pressure. The piston 39 is positioned relative to the end 109 of control sleeve 108 in a position where the orifice port 41 provides an opening resulting in a differential pressure acting on the piston to provide a force balancing the constant force of springs 46—48.

The movable blades 56, located in alignment with each fixed blade 53, have an inlet edge and outlet edge contiguous and parallel to the outlet edge of the fixed blade 53 and the inlet edge of the turbine blade, respectively. The intermediate movable blades 56 also have edges parallel to the pump outlet edges and turbine inlet edges. The blades have a length, substantially equal to the space between the blades so that they completely block vortex flow in the closed position shown in dotted lines in FIGURE 4. The movable blades are located in the axial flow portion of the vortex path to provide improved capacity control and a simplified control mechanism.

The check valve 40 will limit the pressure differential at orifice 41 to prevent excessive pressures in the fluid chamber 37 and to prevent excessive reduction of pressure in the torque converter. The bearing 42 eliminates wear between the non-rotating control sleeve 108 and the piston 39 when the control sleeve engages the piston to close orifice 41. The sleeve 108 in the modification shown in FIGURE 3, may slide within orifice port 41' or rotate with the piston 39, in which event the bearing 42 is unnecessary. As long as the speed remains constant, it is not necessary to change torque converter capacity and the control system remains at rest.

Upon an increase in the load resulting in a slight decrease in output speed, the control rod 97 will move rearwardly or to the right. The linkage will then move the control sleeve 108 to the right and the end of the sleeve 109 will open the orifice port 41 decreasing the pressure differential and permitting springs 46 and 48 to move the piston 39 to the right which returns the orifice port 41 to its original opening re-establishing the balance between the differential pressure and the springs. This will moves the blades counterclockwise as viewed in FIGURE 4 to increase the pump capacity and thus increase the output speed to the set governed value. Conversely, when the load falls off, the slight increase in speed of the output shaft 24 will move the governor control rod 97 to the left or forward. The linkage will then move the control sleeve 108 forwardly closing the orifice port 41 of the motor 38. Since the fluid supply continues, the differential pressure will increase and move the piston 39 against the springs to re-open the port 41 and move the movable blades 56 in a clockwise direction, as viewed in FIGURE 4, to reduce the converter pump capacity. When the reduction in converter pump capacity reduces the output shaft speed to the set value, the piston will be in the balanced position.

In a typical installation employing a converter of this type having a pump element providing both radial and axial flow, the position of the axially located movable blades 56 may be varied between a position of approximately 40° forward angle and 45° backward angle to change the capacity of the converter pump to circulate the hydraulic fluid around the torque converter torus path in vortex flow. At 40° forward angle the pump has a maximum capacity which is reduced as the movable blade is positioned at low forward angles and increasing backward angles due to the reduction of the pumping capacity of the movable blades until at 45° backward angle, the movable blades do not provide any capacity in addition to that of the fixed blades. Further movement of the movable blades 56 beyond approximately 45° backward angle restricts the vortex flow and reduces the pumping action of the fixed blades 53 and further reduces the capacity of the torque converter pump. In the fully closed position, illustrated in dotted lines in FIGURE 4, the movable blades 56 completely block the output from the fixed blade portion of the converter pump and prevent circulation of fluid in the vortex path. In this position of the movable blades 56, converter output will be substantially zero providing a neutral condition where the only drive to the output shaft 24 will be due to the fluid friction drag in the converter.

The fluid exhausted from the fluid motor 38 at port 41 is conveyed by a passage through the bearing 27 to the torque converter chamber to supply operating fluid to the torque converter. The pressure in the torque converter is thus at a lower value than the pressures in the regulated pump outlet line 94 and fluid motor chamber 37. The outlet from the converter flows between the turbine 78 and the first stator 84 in a passage 111 to a passage 113 having a restriction 112 to the sump 114. The restriction 112 provides a constant pressure in the converter chamber.

When this torque converter is employed with a variable speed prime mover, the control system will function in substantially the same manner to provide a constant speed output. Though the input driven pump 35 would provide a volume of fluid varying with input speed, which would vary the normal spacing between the piston 39 and sleeve 108, this variation in spacing is not significant because the annular orifice construction at port 41 permits a very small change in spacing to accommodate a large change in the volume of flow. Thus, the governor will function with a variable or constant fluid supply. In this construction, changes in the output volume of pump 35 due to changes in input speed will tend to move the blades in the same direction as the accompanying changes in output speed acting through the governor and control system. Thus, changes in the volume of the fluid supply to the motor 38 assist, rather than hinder, governor control providing a constant output speed. However, with a large annular orifice, as shown at port 41 in the piston 39, satisfactory regulation by the governor may also be obtained with the fluid and spring acting on opposite sides of the piston 39. If the converter pressure varies too widely due to variations in pump output volume, it may be desirable to provide a relief valve in parallel with or instead of orifice 112 to limit the converter pressure.

Figure 1:
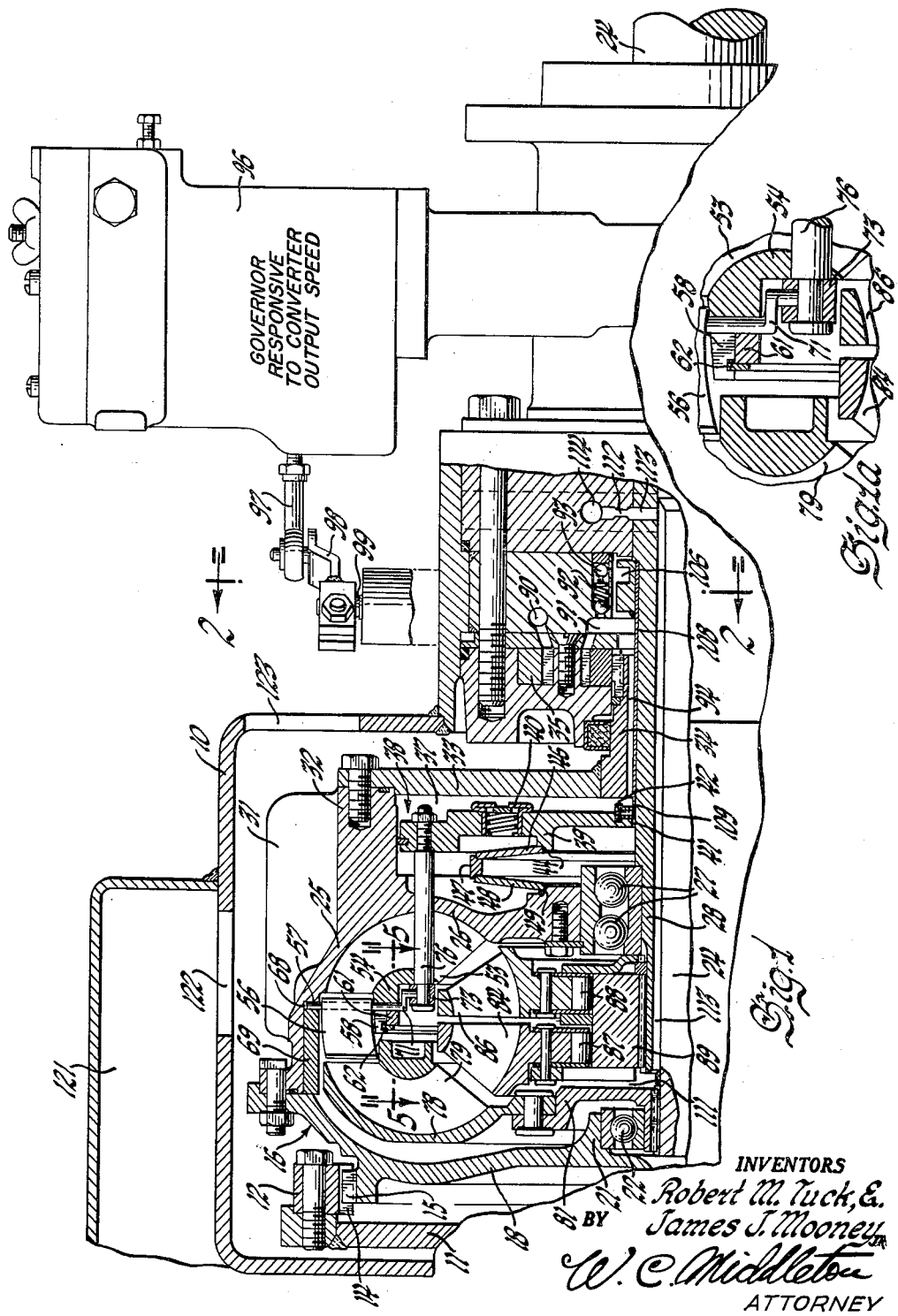
FIGURE 1 shows a section of the variable capacity torque converter with parts broken away to show details.
Figure 6:
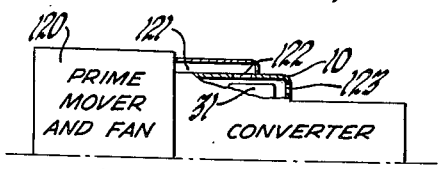
FIGURE 6 is a diagrammatic view showing the prime mover and converter cooling system.

When the torque converter is driven by a prime mover 120, as shown in FIGURE 6, having a cooling fan and a cooling air outlet duct 121, the duct may be connected, FIGURES 1 and 6, to the aperture 122 in converter housing 10 to blow air over the cooling fins 31 and out of aperture 123.

The foregoing preferred embodiments are illustrative of the invention which may be varied by those skilled in the art within the scope of the appended claims.

The claims:

1. In a torque converter having pump, turbine and stator members mounted for rotation about an axis, each of said members having external wall portions forming a substantially torus shaped housing providing a torque converter chamber having a flow path with a radial outward, an outer axial, a radial inward and an inner axial flow portion, said turbine member having an annular series of turbine blades located in said chamber, said turbine blades being located adjacent said turbine wall at one side of said torus chamber in said radial inward flow portion and extending from the inlet edge adjacent the outer diameter of said chamber in a substantially radially inwardly extending curve partially reversing the flow of the fluid to the outlet edge adjacent the inner diameter of said chamber, said stator member having stator blades located in the inner axial flow portion of said chamber, said pump member having an annular series of fixed blades and an annular series of movable blades pivotally mounted on said pump member, said fixed blades being located adjacent the other side of said chamber in said radial outward flow portion, and extending from the inlet edge adjacent the stator blades at the inner diameter of said chamber in a substantially radially outwardly extending curve partially reversing the flow of fluid to the outlet edge adjacent the outer diameter of said chamber, said inlet edges of said turbine blades and said outlet edges of said fixed portions of said pump blades being in spaced planes radial to said axis, said movable blades having inlet edges adjacent said outlet edges of said fixed blades and extending substantially axially across said outer axial flow portion of said chamber to provide axial fluid flow to the outlet edges adjacent the inlet edges of said turbine blades and to provide additional pumping capacity by controlling the direction of fluid flow, said movable blades being spaced apart a distance slightly less than their length, means pivotally mounting said movable blades on said pump member for pivotal movement about the inlet edge from a forward angle to a backward angle, and means to positively move and variably position said movable blades to control the blade angle to provide pumping capacity variable proportional to the blade angle augmenting the pumping capacity of said fixed blades and movable backwardly further until the outlet edge of each movable blade engages the inlet edge of the adjacent movable blade to block the flow of fluid from said pump to said turbine member.

2. In a torque converter, a converter housing, an input and an output member, a pump housing driven by said input member having an outer peripheral wall portion, end wall portions, and a central wall portion centrally attached to said peripheral wall portion and extending radially to divide said pump housing into a converter chamber and a fluid motor chamber and having passage means for the converter fluid connecting said converter chamber to one end of said motor chamber, fixed pump blades mounted on said central wall portion and extending into said converter chamber, turbine blades mounted in said converter chamber adjacent one end wall portion and connected to said output member, and stator blades mounted in said converter chamber, movable pump blades mounted between said fixed pump and turbine blades adjacent said outer peripheral portion and fixed on pivot shafts extending radially of said output member, said pivot shafts being pivotally mounted on said pump housing and having cranks at the inner end, an actuator ring mounted on said pump housing for axial movement between said turbine and fixed pump blades and connected to said cranks to rotate said cranks to vary the angle of said movable pump blades, an annular piston located in said fluid motor chamber having means connected to said actuator ring, spring means in said one end of said motor chamber abutting said central wall portion and said piston, a control fluid supply connected to the other end of said fluid motor chamber to supply a control fluid at a higher pressure to act on said piston to oppose said spring means and converter fluid, and means to control the pressure in said other end of said fluid motor chamber to control the position of said piston and the pitch of said movable pump blades.

3. In a transmission, a housing, an input member, an output member, a fluid torque converter in said housing having an operating chamber, a pump element connected to said input member, a turbine element connected to said output member and a stator, all located in said operating chamber, said pump element having movable blades to substantially infinitely vary the converter pump capacity, a source of fluid under pressure, a governor connected to said output member, a fluid motor having a piston located in a cylinder, means connecting said source to said cylinder to supply fluid to act on one face of said piston, a port in said piston, a control member actuated by said governor cooperating with said port to vary the capacity of said port to permit flow of fluid through said port to position said piston in accordance with the position of said control member, means connecting said port to said housing to supply fluid to said converter operating chamber, means including a relief valve connecting said source to said operating chamber to relieve excessive pressure in said fluid motor and conduct the excess fluid to said converter operating chamber, means to maintain the pressure in said converter operating chamber at a lower value than said source, means to return said piston, and means to connect said piston to said movable blades to vary the angle of said movable blades.

4. In a torque converter having a pump, a turbine and a stator member mounted for rotation about an axis, each of said members having external wall portions forming a substantially torus shaped housing providing a torque converter chamber having a flow path with a radial outward, an outer axial, a radial inward and an inner axial flow portion, said turbine member having an annular series of turbine blades located in said radial inward flow portion of said chamber, said stator member having stator blades located in the inner axial flow portion of said chamber, said pump member having an annular series of fixed blades and movable blades pivotally mounted on said pump member, said fixed blades being located in said radial outward flow path of said chamber and receiving fluid directly from said stator blades and extending from the inlet edge in a substantially radially outwardly extending direction to the outlet edge substantially at the outer diameter of said chamber, said movable blades having inlet edges directly adjacent to said outlet edges of said fixed blades to receive fluid directly from said fixed blades to form a continuous two part pump blade and extending substantially axially along the outer axial flow portion of said chamber to provide axial fluid flow to the outlet edges directly adjacent the inlet edges of said turbine blades, and means to positively move and selectively position said movable blades in a plurality of angular positions in a range of angular positions relative to said fixed blades to increase the angular momentum of the fluid during passage through said movable blades by controlling the direction of flow of the fluid.

5. In a torque converter having a pump, a turbine and a stator member mounted for rotation about an axis, each of said members having external wall portions forming a substantially torus shaped housing providing a torque converter chamber having a flow path with a radial outward, an outer axial, a radial inward and an inner axial flow portion, said turbine member having an annular series of turbine blades located in said radial inward flow portion of said chamber, said stator member having stator blades located in said inner axial flow portion of said chamber, said pump member having an annular series of fixed blades and movable blades pivotally mounted on said pump member, said fixed blades being located in said radial outward flow path of said chamber and receiving fluid directly from said stator blades and extending from the inlet edge in a substantially radially outwardly extending direction to the outlet edge substantially at the outer diameter of said chamber to increase the angular momentum by centrifugal pumping action, and said movable blades having inlet edges directly adjacent to said outlet edges of said fixed blades and receiving fluid directly from said fixed blades and extending substantially axially the entire length of said outer axial flow portion of said chamber to provide axial fluid flow to the outlet edges directly adjacent the inlet edges of said turbine blades, said outlet edges of said fixed blades and said inlet edges of said movable blades extending substantially radially, said movable blades being mounted on a substantially radial pivot at said inlet edges of said movable blades, and means to positively move and selectively position said movable blades in a plurality of angular positions to variably increase the angular momentum from substantially zero through a range of positive values during axial flow due to the change in the direction of the flow through the movable blades without any centrifugal pumping action.

6. In a torque converter having a pump, a turbine and a stator member mounted for rotation about an axis, each of said members having external wall portions and internal wall portions forming a substantially torus shaped housing having a central eye providing a torque converter chamber having a flow path with a radial outward, an outer axial, a radial inward and an inner axial flow portion, said turbine member having an annular series of turbine blades located in said ardial inward flow portion of said chamber, said stator member having stator blades located in said inner axial flow portion of said chamber, said pump member having an annular series of fixed blades and movable blades pivotally mounted on said pump member, said fixed blades being located in said radial outward flow path of said chamber having inlet edges between said inner axial flow portion and said radial outward flow portion and receiving fluid directly from said stator blades and extending from said inlet edges in a substantially radially outwardly extending direction to the outlet edge, said outlet edge radially located between said radial outward flow portion and said outer axial flow portion and having a maximum radius substantially as large as the maximum radius of said chamber and located on the same side of said maximum radius as said pump member to increase the angular momentum by centrifugal pumping action, and said movable blades having radial inlet edges directly adjacent to said outlet edges of said fixed blades and extending substantially the axial length of said outer axial flow portion of said chamber to provide axial fluid flow to the outlet edges located between said outer axial flow portion and said radial inward flow portion and directly adjacent the inlet edges of said turbine blades, said outlet edges of said fixed blades and said inlet edges of said movable blades extending radially and said movable blades being mounted on a substantially radial pivot at said inlet edges of said movable blades, and means to positively move and selectively position said movable blades in a plurality of angular positions to variably increase the angular momentum from substantially zero through a range of positive values during axial flow due to the change in the direction of the flow through the movable blades without any centrifugal pumping action.

7. In a torque converter having a pump, a turbine and a stator member mounted for rotation about an axis, each of said members having external wall portions forming a substantially torus shaped housing providing a torque converter chamber having a flow path having a radial outward, an outer axial, a radial inward and an inner axial flow portion forming a continuous torus flow path, said turbine member having an annular series of turbine blades extending for the entire length of said radial inward flow portion of said chamber, said stator member having stator blades extending for the entire length of said inner axial flow portion of said chamber, said pump member having an annular series of fixed blades and movable blades pivotally mounted on said pump member, said fixed blades extending for the entire length of said radial outward flow path of said chamber and receiving fluid from said stator blades and extending from the inlet edge in a substantially radially outwardly extending direction to the outlet edge adjacent the outer diameter of said chamber to increase the angular momentum by centrifugal pumping action, and said movable blades having inlet edges directly adjacent to said outlet edges of said fixed blades and extending substantially the entire axial length of said outer axial flow portion of said chamber to provide axial fluid flow to the outlet edges directly adjacent the inlet edges of said turbine blades to increase the angular momentum of the fluid during axial flow by changing the direction of flow and without any additional centrifugal pumping action, said outlet edges of said fixed blades and said inlet edges of said movable blades extending substantially radially and said movable blades being pivoted at said inlet edges, and means to positively move and selectively position said movable blades in a plurality of angular positions from a maximum capacity angular position through a range of decreasing capacity angular positions changing the direction of fluid flow to an angular position in which the movable blades provide no additional capacity and to continue movement in the same direction to throttle flow to decrease the capacity of said fixed blades.

8. In a transmission, a housing, an input member, an output member, a fluid torque converter in said housing having an operating chamber and located therein, a pump element connected to said input member, a turbine element connected to said output member and a stator element, one of said elements having means to vary said converter capacity, a source of fluid under pressure, a fluid motor having a piston located in a cylinder and dividing said cylinder into two cylinder parts, means connecting said source to one of said cylinder parts to supply fluid to act on said piston, a controlled passage connecting said one part of said cylinder to the other part of said cylinder, means providing fluid communication between siad other of said cylinder parts and said operating chamber to supply fluid to said operating chamber, means to maintain the pressure in said operating chamber less than the pressure of said source, a control member movable to a plurality of control positions, control means including means responsive to piston position and control member position cooperating with said controlled passage to vary the capacity of said passage to permit flow of fluid through said passage from said one part of said cylinder to said other part of said cylinder and said operating chamber to provide a differential pressure acting on said piston to position said piston in accordance with the position of said control member, means to return said piston including pressure in said other of said cylinder parts and said operating chamber, and means to connect said piston to said means to vary the converter capacity.

9. The invention defined in claim 8 and means including a pressure relief valve connecting said source to said operating chamber to limit the pressure differential between said one part of said cylinder and said other part of said cylinder to a normal operating pressure differential sufficient to move said piston and to insure a substantially continuous supply of fluid to said operating chamber.

10. The invention defined in claim 8 and said means to vary converter capacity being variable pitch blades on said pump element, means connecting said blades to said piston to vary blade pitch with piston movement, said source providing a substantially constant volume of fluid flow under pressure, a governor responsive to the speed of said output shaft connected to said control member to actuate said control member to control said piston to vary said blade pitch to provide constant speed operation.

11. In a transmission, a transmission housing, an input member, an output shaft, a torque converter housing having an operating chamber, pump blading connected to said input member, turbine blading connected to said output shaft, and stator blading, said blading being located in said operating chamber, means to vary the capacity of said torque converter, a ground sleeve concentric with said output shaft and fixed to said transmission housing and supporting said stator, a cylinder concentric with said ground sleeve having an annular piston in said cylinder, means connecting said piston to said means to vary the capacity of said torque converter, said annular piston having an inner edge spaced from said ground sleeve to provide a control port, a fluid pressure source connected to said one end of said cylinder to urge said piston in one direction, means to urge said piston in the other direction, and a control sleeve movably mounted concentrically on said ground sleeve and movable from a position permitting free fluid flow from said one end of said cylinder through said control port to exhaust to a position restricting fluid flow from one end of said cylinder through said control port.

12. The invention defined in claim 11 and said exhaust flow from said control port being connected to the other end of said cylinder and to said operating chamber.

13. In a transmission, a transmission housing, an input member, an output shaft, a torque converter housing fixed to said input member and having an operating chamber, pump blading mounted on said converter housing, turbine blading connected to said output shaft, and stator blading, said blading being located in said operating chamber, means to vary the capacity of said torque converter, a ground sleeve concentric with said output shaft and fixed to said transmission housing and supporting said stator, a cylinder rotatable with said torque converter housing concentric with said ground sleeve having an annular piston mounted in said cylinder for axial movement, means causing said piston to rotate with said cylinder and connecting said piston to said means to vary the capacity of said torque converter, said piston having an inner edge spaced from said ground sleeve to provide a control port, a fluid pressure source having a substantially constant volume fluid flow connected to one end of said cylinder to move said piston in one direction, means to move said piston in the other direction, and a control sleeve nonrotatably and axially movably mounted concentrically on said ground sleeve and movable from a position permitting free fluid flow from said one end of said cylinder through said control port to exhaust to a position restricting the fluid flow through said control port to control the position of said piston and said means to vary the capacity of said torque converter.

14. In a transmission, a transmission housing, an input member, an output shaft, a torque converter housing fixed to said input member and having an operating chamber, pump blading including movable variable pitch blades mounted on said converter housing, turbine blading connected to said output shaft, and stator blading, said blading being located in said operating chamber, a ground sleeve concentric with said output shaft and fixed to said transmission housing and supporting said stator, a cylinder concentric with said ground sleeve having an annular piston in said cylinder, means connecting said piston to said variable pitch blades to vary the capacity of said torque converter, said piston having an inner edge spaced from said ground sleeve to provide a control port, a source of fluid under pressure providing a substantially constant volume fluid flow connected to one end of said cylinder to move said piston in one direction, means to move said piston in the other direction, a control sleeve movably mounted concentrically on said ground sleeve and movable from a position permitting free fluid flow from said one end of said cylinder through said control port to exhaust to a position restricting fluid flow through said control port, and governor means driven by said output shaft and connected to said control sleeve to control said control sleeve in accordance with the speed of said output shaft to move said piston and variable pitch blades to control the pitch of said variable pitch blades to vary the torque converter capacity to provide constant output shaft speed.

15. In a transmission, a transmission housing, an input member, an output shaft, a torque converter housing fixed to said input member and having an operating chamber, pump blading including movable variable pitch blades mounted on said converter housing, turbine blading connected to said output shaft, and stator blading, said blading being located in said operating chamber, a ground sleeve concentric with said output shaft and fixed to said transmission housing and supporting said stator, a cylinder rotatable with said torque converter housing concentric with and sealed to said ground sleeve having an annular piston mounted in said cylinder for axial movement, means rotating said piston with said cylinder and connecting said piston to said variable pitch blades to vary the capacity of said torque converter, said piston having an inner edge spaced from said ground sleeve to provide an annular control port, a source of fluid under pressure providing a substantially constant volume fluid flow connected to one end of said cylinder, a control sleeve nonrotatably and axially movably mounted concentrically on said ground sleeve and movable from a position permitting free fluid flow from said one end of said cylinder through said control port to exhaust to a position restricting fluid flow through said control port, and governor means driven by said output shaft and connected to said control sleeve to control said control sleeve in accordance with the speed of said output shaft to move said piston and variable pitch blades to control the pitch of said variable pitch blades to vary the troque converter capacity to provide constant output shaft speed.

16. In a transmission, an input member, an output member, drive means connecting said input member and said output member including a fluid drive and a fluid actuated drive control device, said fluid drive having an operating chamber and including a pump located in said operating chamber and connected to be driven by said input member and a turbine located in said operating chamber and connected to drive said output member, said fluid actuated drive control device including an expansible chamber motor having a motor chamber and a movable wall moved in one direction by fluid in said motor chamber and biased to move in the opposite direction, operable on a change of pressure of fluid in said motor chamber to actuate said drive control device, a source of fluid under pressure providing a continuous supply of fluid, means to maintain said operating chamber at a lower pressure than said source, control means connecting said source to said motor chamber and operating chamber including supply means freely and substantially continuously connecting said source to said motor chamber at all times and including valve means controlling the rate of flow of fluid from said supply means and motor chamber to said operating chamber to control the pressure of fluid in said motor chamber to control said expansible chamber motor and to provide a substantially continuous supply of fluid to said operating chamber of said fluid drive.

17. In a transmission, an input member, an output member, drive means connecting said input member and said output member including a fluid drive and a fluid actuated drive control device, said fluid drive having an operating chamber and including a pump located in said operating chamber and connected to be driven by said input member and a turbine located in said operating chamber and connected to drive said output shaft, said fluid actuated drive control device including an expansible chamber motor having a motor chamber and a movable wall moved in one direction by fluid in said motor motor chamber and biased to move in the opposite direction and operable on a change of pressure of fluid in said motor chamber to actuate said drive control device, a source of fluid under pressure providing a continuous suppply of fluid, means to maintain said operating chamber at a lower pressure than said source, supply means continuously connecting said source to said motor chamber of said expansible chamber motor, and control means connecting said motor chamber to said operating chamber and controlling the rate of flow from said motor chamber to said operating chamber to control the pressure of fluid in said motor chamber to control said expansible chamber motor and to provide a substantially continuous supply of fluid to said operating chamber of said fluid drive.

18. The invention defined in claim 17, said movable wall of said expansible chamber motor including port means in said movable wall, said control means connecting said motor chamber through said port to said operating chamber and including a movable control valve member to control the flow of fluid through said port to control the rate of flow of fluid from said motor chamber to said operating chamber to control the position of said movable wall in accordance with the position of said control valve means.

19. In a transmission, a housing, an input member, an output member, a fluid torque converter in said housing having, an operating chamber, a pump element connected to said input member, and a turbine element connected to said output member, said pump element having movable blades to substantially infinitely vary the converter pump capacity, a source of fluid under pressure, a governor connected to said output member, a fluid motor having a movable piston located in a cylinder, means connecting said source to said cylinder to supply fluid to act on said piston, a port in said piston, control means actuated by said governor movable proportional to output member speed coaxial with movement of said movable piston and cooperating with said port to vary the capacity of said port to permit flow of fluid through said port to exhaust to position said piston in accordance with the position of said control means, means to return said piston, means connecting said exhaust flow from said port to said operating chamber, means maintaining the pressure in said operating chamber lower than the pressure of said source, and means to connect said piston to said movable blades to vary the converter pump capacity to provide constant speed operation.

References Cited in the file of this patent

UNITED STATES PATENTS

| | | |
|---|---|---|
| 1,967,893 | Libby | July 24, 1934 |
| 2,117,673 | Lysholm | May 17, 1938 |
| 2,168,863 | Sensaud de Lavaud | Aug. 8, 1939 |
| 2,222,618 | Jandasek | Nov. 26, 1940 |
| 2,235,370 | Jandasek | Mar. 18, 1941 |
| 2,287,374 | Dodge | June 23, 1942 |
| 2,325,814 | Tyler | Aug. 3, 1943 |
| 2,336,167 | Dillon | Dec. 7, 1943 |
| 2,380,074 | Roche | July 10, 1945 |
| 2,384,841 | Lang et al. | Sept. 18, 1945 |
| 2,506,576 | Butler | May 9, 1950 |
| 2,613,503 | Syrovy | Oct. 14, 1952 |
| 2,638,746 | Kelley | May 19, 1953 |
| 2,680,954 | Churchill | June 15, 1954 |
| 2,699,642 | Ahlen | Jan. 18, 1955 |
| 2,701,948 | Iavelli et al. | Feb. 15, 1955 |
| 2,805,549 | Hensleigh et al. | Sept. 10, 1957 |

FOREIGN PATENTS

| | | |
|---|---|---|
| 519,968 | Great Britain | Apr. 10, 1940 |